Sept. 16, 1952  H. RUBIN  2,610,546
CONDENSER LENS ARRANGEMENT FOR PROJECTORS
Filed April 28, 1950
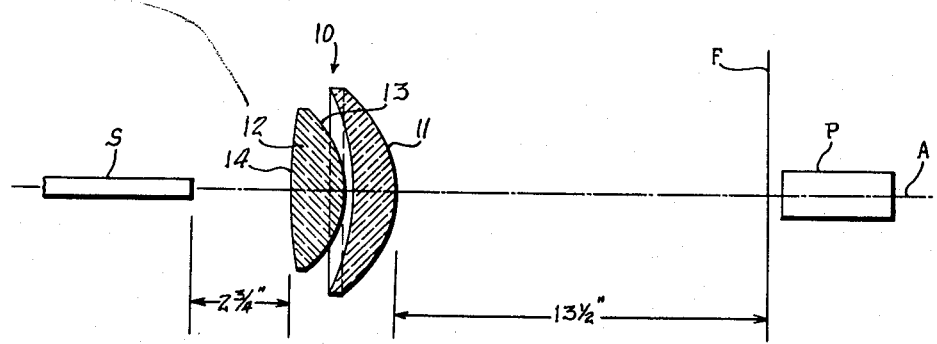
INVENTOR.
HARRY RUBIN
BY
ATTORNEY Patented Sept. 16, 1952

2,610,546

UNITED STATES PATENT OFFICE 2,610,546

CONDENSER LENS ARRANGEMENT FOR PROJECTORS

Harry Rubin, Belle Harbor, N. Y.

Application April 28, 1950, Serial No. 158,879

1 Claim. (Cl. 88—57)

This invention relates to new and useful improvements in a two element condenser system for a motion picture projector and more particularly to an improved rear element of such a two element condenser system.

Two element condenser systems for motion picture projectors have been in use for some time; however, it has been common in those prior art systems to employ a front lens with one spherical and one parabolic surface and a rear lens having a rear cylindrical surface and a front spherical surface. While those prior condenser systems have enjoyed a measure of success they have left much to be desired in their tendency to produce a "hot spot" in the center of the projected picture and the necessity for decreased theatre illumination in order that the edges of the projected picture can be seen.

More particularly, the present invention proposes an improved two element condenser system having a rear element of a new design and which system will overcome the objections to the prior art two element condenser systems by permitting theatre auditoriums to be lighted more brightly in the interest of safety and in theatres where greater screen brightness is not needed, the increased efficiency of the new condenser system will permit a reduction in current used in the arc of the light source.

A further object of the present invention proposes a two element condenser system for a motion picture projector having a rear element in which both surfaces are circularly-convexly curved in a manner to eliminate the customary "hot spot" in the center of the projected picture producing a projected picture which is more evenly lighted on the whole surface of the screen.

Another object of the present invention is to provide a two element condenser system for motion picture projectors which will improve overall picture clarity by increasing the amount of light and which will provide for more even diffusion of light which gives sharper definition to the projected picture.

The present invention further proposes an improved condenser system in which an intensified screen light is achieved with a negligible increase of heat at the film gate aperture of only ten per cent.

Still another object of the present invention proposes the provision of an improved condenser system which can be installed as standard equipment on new high intensity arc lamp motion picture projectors or which can be installed in any standard high intensity arc lamp projector now in use with no increase in current in the light source.

A still further object of the present invention proposes a condenser system for a motion picture projector employing a rear element having an aspherical front side and a spherical rear side.

It is a further object of the present invention to provide a two element condenser system for motion picture projectors which is simple to manufacture and which can be offered for sale at a reasonable cost.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:

The single figure is a schematic illustration of a motion picture projector having a two element condenser system in accordance with the present invention.

On the single figure of the drawing there is schematically illustrated the important parts of a motion picture projector lighting system of the type generally employed in motion picture theatres for projecting standard 35 mm. films. Those parts are comprised of a source of light S which in the conventional theatre-type motion picture projector is an arc light, a conventional projection lens P with the letter F designating the normal plane of the film strip just in back of the lens P. The line indicated by the letter A is the normal longitudinal projection axis of the projector.

The improved two element condenser system 10, of the present invention, is comprised of a front element 11 and a rear or collector element 12. The front element 11 is of conventional formation and has one spherical meniscus surface and one parabolic surface, or is a plano convex spherical condenser.

The rear element 12 is comprised of two circularly-convexly curved surfaces consisting of an aspherical front side 13 and a spherical rear side 14.

The strong convex surface forming the aspherical front side 13 of the rear element 12 follows the general formula for a parabolic curve which is:

$$Y^2 = 2PX$$

The value of P (the distance of the focus from the directrix and the vertex radius of curvature of the parabolic surface determined by the above equation) in the formula is 71.5 mm. and choosing some value for X or Y, the other ordinate can be readily resolved by substitution in the equation. The spherical radius of the spherical rear side 14 of the rear element 12 is 364 mm.

As indicated on the drawing, the two element condenser system of the present invention is positioned between the source of light S and the normal path of the film F with the front side of the front element 11 located 13½ inches to the rear of the normal film path F and with the spherical rear side of the rear element 12 located 2¾ inches in front of the source of light S. The exact setting of the condenser will vary just slightly from those dimensions and the settings should be made and then, after the arc has been struck, adjusted to obtain the best results. The exact setting will vary slightly with the focal length and type of projection lens used, and on the exact thickness of the condensers which will vary in manufacture.

Experiments with the condenser of the present invention have proven that a more evenly and a more intensely lighted projected picture results from the use of the condenser system of the present invention which permits the interior of the theater to be more brightly lighted in the interest of safety without interfering with the brilliance of the projected picture.

While I have illustrated and described the preferred embodiment of my invention, it is to be understood that I do not limit myself to the precise construction herein disclosed and the right is reserved to all changes and modifications coming within the scope of the invention as defined in the appended claim.

Having thus described my invention, what I claim as new, and desire to secure by United States Letters Patent is:

A rear or collector element for use in a two element condenser system of a motion picture projector lamp having both sides thereof circularly-convexly curved, said rear element having an aspherical front side and a spherical rear side, said aspherical front side being a parabolic curve based on the equation $Y^2=2PX$ in which P equals 71.5 mm. and which equals the vertex radius of curvature of said aspherical front side determined by the said equation for assigned values of X or Y, where the values of X extend parallel to the optical axis and the values of Y extend normal thereto, said spherical rear side having a radius of 364 mm.

HARRY RUBIN.

REFERENCES CITED

The following references are of record in the file of this patent:

UNITED STATES PATENTS

| Number | Name | Date |
|---|---|---|
| 934,579 | Straubel et al. | Sept. 21, 1909 |
| 1,615,674 | Beechlyn | Jan. 25, 1927 |
| 1,617,596 | Holman | Feb. 15, 1927 |
| 1,621,741 | Kellner | Mar. 22, 1927 |
| 2,140,979 | Bertele | Dec. 20, 1938 |
| 2,180,031 | Carlson | Nov. 14, 1939 |
| 2,262,534 | Hock | Nov. 11, 1941 |
| 2,284,567 | French | May 26, 1942 |